United States Patent
Boddakayala (10) Patent No.: US 12,080,864 B2
(45) Date of Patent: Sep. 3, 2024

(54) ELECTRIC VEHICLE BATTERY COLD PLATE ASSEMBLIES

(71) Applicant: 3M INNOVATIVE PROPERTIES COMPANY, St. Paul, MN (US)

(72) Inventor: Bhaskara Boddakayala, Troy, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 504 days.

(21) Appl. No.: 17/413,033

(22) PCT Filed: Dec. 12, 2019

(86) PCT No.: PCT/IB2019/060708
§ 371 (c)(1),
(2) Date: Jun. 11, 2021

(87) PCT Pub. No.: WO2020/121244
PCT Pub. Date: Jun. 18, 2020

(65) Prior Publication Data
US 2022/0021048 A1 Jan. 20, 2022

Related U.S. Application Data

(60) Provisional application No. 62/779,746, filed on Dec. 14, 2018.

(51) Int. Cl.
*H01M 10/613* (2014.01)
*B60L 50/51* (2019.01)
(Continued)

(52) U.S. Cl.
CPC ......... *H01M 10/6554* (2015.04); *B60L 50/51* (2019.02); *B60L 50/64* (2019.02);
(Continued)

(58) Field of Classification Search
CPC .......... H01M 10/6554; H01M 10/613; H01M 10/625; H01M 10/6556; H01M 50/204; H01M 2220/20; B60L 50/51; B60L 50/64
See application file for complete search history.

(56) References Cited

U.S. PATENT DOCUMENTS 9,673,491 B2    6/2017  Fabian
9,852,963 B2   12/2017  Shedd
(Continued)

FOREIGN PATENT DOCUMENTS

DE      102015107170        11/2016
JP       2017112032 A         6/2017

OTHER PUBLICATIONS

International Search Report for PCT International Application No. PCT/IB2019/060708, mailed on Mar. 5, 2020, 5 pages.

*Primary Examiner* — Adam A Arciero
(74) *Attorney, Agent, or Firm* — Carlos M. Téllez Rodríguez; 3M Innovative Properties Co (57) ABSTRACT

An electric vehicle battery cold plate assembly comprising a top plate having a lower major surface with at least one patterned open-faced cooling channel formed therein and intermediate land area, a bottom plate or battery tray, and one or a combination of (a) a continuous or mostly continuous layer or sheet of organic bonding agent/adhesive disposed so as to cover and bond together at least most or all of an upper major surface of the bottom plate and at least most or all of the intermediate land area of the top plate, (b) strips or a pattern of organic bonding agent/adhesive disposed so as to cover and bond together at least most or all of the intermediate land area of the top plate and corresponding area on an upper major surface of the bottom plate, and (c) strips or a pattern of organic bonding agent/adhesive disposed so as to cover and bond together at least most or all (Continued)

of the intermediate land area of the top plate and corresponding area on the upper major surface of the battery tray.

6 Claims, 5 Drawing Sheets

(51) Int. Cl.
  *B60L 50/64* (2019.01)
  *H01M 10/625* (2014.01)
  *H01M 10/6554* (2014.01)
  *H01M 10/6556* (2014.01)
  *H01M 50/204* (2021.01)

(52) U.S. Cl.
  CPC ....... *H01M 10/613* (2015.04); *H01M 10/625* (2015.04); *H01M 10/6556* (2015.04); *H01M 50/204* (2021.01); *H01M 2220/20* (2013.01)

(56) References Cited

U.S. PATENT DOCUMENTS

| | | |
|---|---|---|
| 2013/0171493 A1 | 7/2013 | Wayne |
| 2013/0202924 A1* | 8/2013 | Kwak ............... H01M 10/6561 429/81 |
| 2015/0086831 A1 | 3/2015 | Haussmann |
| 2015/0229009 A1 | 8/2015 | Gruenwald |
| 2016/0025428 A1 | 1/2016 | Hendrix |
| 2017/0263987 A1 | 9/2017 | Kopp |
| 2017/0294693 A1 | 10/2017 | Tong |
| 2018/0241103 A1 | 8/2018 | Pfeiff |

* cited by examiner

Overlap Shear Strength

| Adhesive | Samples | RT, Mpa | 24 hours at -30C, Mpa |
|---|---|---|---|
| SAT 1010 | 1 | 17.82 | 11.73 |
| | 2 | 15.17 | 18.70 |
| | 3 | 16.45 | 8.11 |
| | Avg | 16.48 | 12.84 |
| SAT 1100 | 1 | 18.81 | 22.00 |
| | 2 | 18.82 | 11.50 |
| | 3 | 22.47 | 11.87 |
| | Avg | 20.05 | 15.12 |

T-Peel Strength

| Adhesive | Samples | RT, N/mm | 24 hours at -30C, N/mm |
|---|---|---|---|
| SAT 1010 | 1 | 4.96 | 3.27 |
| | 2 | 3.38 | 3.86 |
| | 3 | 3.97 | 3.30 |
| | Avg | 4.09 | 3.47 |
| SAT 1100 | 1 | 2.79 | 215 |
| | 2 | 2.52 | 2.24 |
| | 3 | 1.49 | |
| | Avg | 2.27 | 2.19 |

FIG. 6

ELECTRIC VEHICLE BATTERY COLD PLATE ASSEMBLIES

CROSS REFERENCE TO RELATED APPLICATIONS

This application is a national stage filing under 35 U.S.C. 371 of PCT/IB2019/060708, filed Dec. 12, 2019, which claims the benefit of U.S. Provisional Application No. 62/779,746, filed Dec. 14, 2018, the disclosures of which are incorporated by reference in their entireties herein.

The present invention relates to electric vehicles, in particular, to electric vehicle battery assemblies and, more particularly, to heat sink (e.g., cold plate) assemblies forming part of an electric vehicle battery assembly.

BACKGROUND

Electric vehicles are those partially (e.g., hybrid vehicles that use electricity in combination with gasoline or diesel fuel) or completely (i.e., electric vehicles) powered by electric energy, typically flowing from one or more battery assemblies. Such battery assemblies typically include battery cells mounted in some form of support structure.

Li-Ion batteries are typically used in electric vehicles to store energy and to provide power for the operation of the vehicle. The flow of current either into the battery during recharge or out of the battery into the vehicle and its accessories causes the generation of heat, which needs to be managed/dissipated, proportional to the square of the current multiplied by the internal resistance of the battery cells and interconnected systems. A higher current flow implies a more intensified heating effect. Li-Ion batteries perform optimally within a specific operating temperature range. If operation occurs outside the bounds of the specified range, then damage or accelerated degradation of the cells within the battery occurs. The battery may also need to be cooled or heated depending upon environmental conditions. This, in turn, drives the need to effectively manage thermal aspects of the battery before and during use and recharge. Thus, some form of heat sink (e.g., cold plate) assembly is usually included as part of the battery assembly to help maintain the battery cells within their optimum operating temperature range.

There are several thermal management methods used to address the physical and performance demands on battery assemblies (and associated cells). They include: Passive or active air convection, cooling or heating by exposing the battery with a dielectric substance, and circulating a water-based coolant through passages within the compartment in which the battery cells are secured.

The configuration and materials used to assemble the battery compartment can be chosen to act as a heat sink (e.g., cold plate assembly) working in conjunction with the thermal management methods. In many configurations, the heat sink is in the form of a cold plate assembly composed of thermally conductive materials (e.g., steel or aluminum). Aluminum has been preferred due to its high thermal conductivity. Aluminum's lighter weight is also desirable, because the battery assemblies of electric vehicles account for a large percentage of the vehicle mass, and a heavier vehicle will demand more power and current to operate (which consequentially generates more heat). Typically, a heat sink design is in the form of a cold plate assembly incorporated into a tray on which the battery cells are mounted. One such cold plate assembly design includes a top plate, with coolant channels integrally formed on its underside, joined to a flat bottom plate by brazing. The use of brazing provides highly durable cold plate assemblies, but such processing is labor intensive, time consuming and costly.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

There is a need for better designed cold plate assemblies for electric vehicles. The present invention describes such an improved cold plate assembly design. In one aspect, the present invention discloses the use of structural adhesives to replace brazing while maintaining and/or improving heating or cooling performance.

In one aspect, the present invention provides an electric vehicle battery cold plate assembly comprising a top plate having a lower major surface with at least one patterned open-faced cooling channel formed therein and intermediate land area; a flat bottom plate; and a continuous or mostly continuous layer or sheet of organic bonding agent/adhesive disposed so as to cover and bond together at least most or all of an upper major surface of the bottom plate and at least most or all of the intermediate land area of the top plate.

In another aspect, the present invention provides an electric vehicle battery cold plate assembly comprising a top plate having a lower major surface with at least one patterned open-faced cooling channel formed therein and intermediate land area; a flat bottom plate; and strips or a pattern of organic bonding agent/adhesive disposed so as to cover and bond together at least most or all of the intermediate land area of the top plate and corresponding area on an upper major surface of the bottom plate.

In yet another aspect, the present invention provides an electric vehicle battery cold plate assembly comprising a top plate having a lower major surface with at least one patterned open-faced cooling channel formed therein and intermediate land area; a battery tray having an upper major surface; and strips or a pattern of organic bonding agent/adhesive disposed so as to cover and bond together at least most or all of the intermediate land area of the top plate and corresponding area on the upper major surface of the battery tray.

The present invention also provides various method of making electric battery cold plate assemblies, as well as electric vehicle battery assemblies or modules that include such cold plate assemblies and electric vehicles that use such battery assemblies or modules.

These and other aspects, embodiment, features and/or advantages of the invention are further shown and described in the drawings and detailed description herein, where like reference numerals are used to represent similar parts. It is to be understood, however, that the drawings and description are for illustration purposes only and should not be read in a manner that would unduly limit the scope of this invention.

The above summary of the present invention is not intended to describe each disclosed embodiment or every implementation of the present invention. The description that follows more particularly exemplifies illustrative embodiments. In several places throughout the application, guidance may be provided through lists of examples, which examples can be used in various combinations. In each instance, the recited list serves only as a representative group and should not be interpreted as an exclusive list.

DETAILED DESCRIPTION OF CERTAIN EMBODIMENTS

In describing preferred embodiments of the invention, specific terminology is used for the sake of clarity. The invention, however, is not intended to be limited to the specific terms so selected, and each term so selected includes all technical equivalents that operate similarly.

The terms "comprises", "includes", and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "and/or" means one or all of the listed elements or a combination of any two or more of the listed elements (e.g., preventing and/or treating an affliction means preventing, treating, or both treating and preventing further afflictions).

The recitation of numerical ranges by endpoints includes all numbers subsumed within that range in increments commensurate with the degree of accuracy indicated by the end points of the specified range (e.g., for a range of from 1.000 to 5.000, the increments will be 0.001, and the range will include 1.000, 1.001, 1.002, etc., 1.100, 1.101, 1.102, etc., 2.000, 2.001, 2.002, etc., 2.100, 2.101, 2.102, etc., 3.000, 3.001, 3.002, etc., 3.100, 3.101, 3.102, etc., 4.000, 4.001, 4.002, etc., 4.100, 4.101, 4.102, etc., 5.000, 5.001, 5.002, etc. up to 5.999) and any range within that range, unless expressly indicated otherwise.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer" or "plastic" will be understood to include polymers, copolymers (e.g., polymers formed using two or more different monomers), oligomers and combinations thereof, as well as polymers, oligomers, or copolymers that can be formed in a miscible blend.

Figure 1:
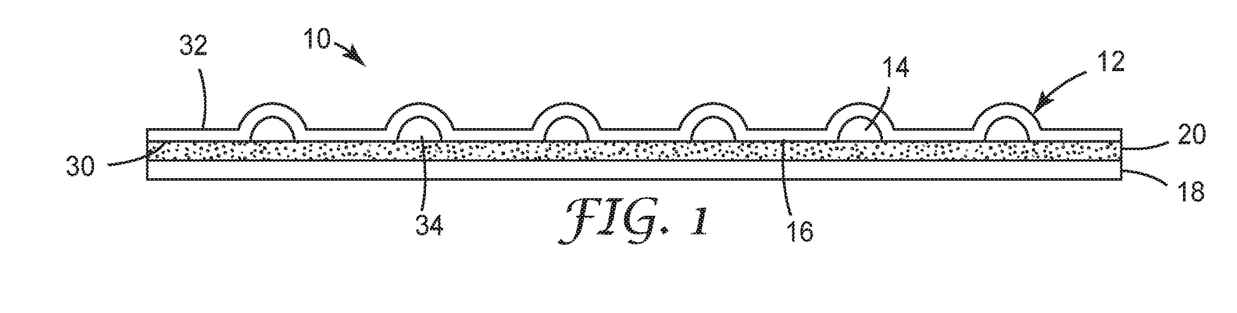
FIG. 1 is a cross-sectional side view of one embodiment of a cold plate assembly for an electric vehicle battery assembly, according to the present invention.
Figure 2:
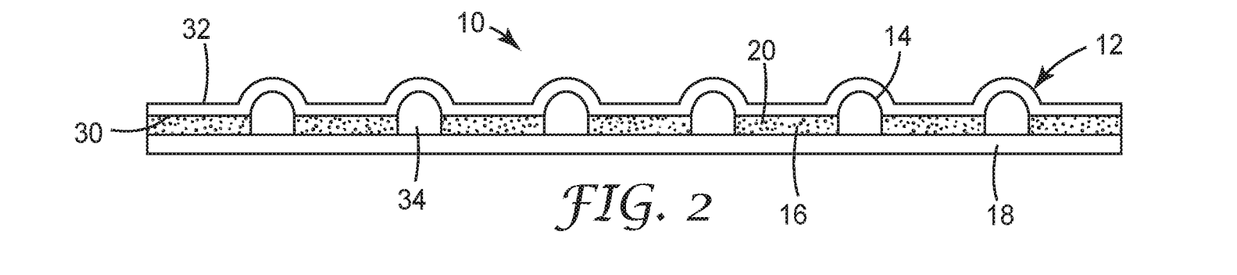
FIG. 2 is a cross-sectional side view of another embodiment of a cold plate assembly for an electric vehicle battery assembly, according to the present invention.

In FIG. 1, a cold plate assembly 10 for an electric vehicle battery assembly. The cold plate assembly 10 comprises a coolant circulation channel formed by a top plate 12 that is corrugated, stamped or otherwise formed with a patterned open-faced cooling channel 14 and intermediate land area 16, a flat bottom plate 18, and a continuous or mostly continuous (i.e., at least 50% of its surface area is continuous) layer or sheet of organic bonding agent/adhesive 20 disposed so as to cover and bond together at least most (i.e., at least 50% of the surface area) or all of an upper major surface of the bottom plate 18 and at least most (i.e., at least 50% of the surface area) or all of the intermediate land area 16 of the top plate 12. The channel pattern 14 is formed on the lower major surface 30 of the top plate 12. In FIG. 2, a cold plate assembly 10 for an electric vehicle battery assembly comprises a top plate 12 that is corrugated, stamped or otherwise formed with a patterned open-faced cooling channel 14 and intermediate land area 16, a flat bottom plate 18, and strips or a pattern of organic bonding agent/adhesive 20 disposed so as to cover and bond together at least most (i.e., at least 50% of the surface area) or all of the intermediate land area 16 of the top plate 12 and corresponding area on an upper major surface of the bottom plate 18. In the embodiments shown in FIGS. 1 and 2, the top plate 12 and bottom plate 18 of the cold plate assembly 10 can be made of aluminum or aluminum alloy bonded affixed together with a structural adhesive such as, for example, those manufactured by 3M Company (e.g., 3M Company product numbers DP 8410, SA-9820 and SAT1010). Alternatively, the cold plate components can be made using other metals, metal alloys, sufficiently high temperature plastics, or fiber (e.g., carbon fiber, etc.) reinforced polymeric or ceramic composites. It may also be desirable to use dissimilar materials (e.g., any combination of dissimilar metals, plastics and/or composites) for the cold plate components. When dissimilar metals are chosen (e.g., aluminum and steel) that can induce galvanic corrosion, it can be desirable to use the embodiment of FIG. 1, with the layer of bonding agent/adhesive 20 being continuous and functioning as an isolation barrier (see also FIG. 5B). Various combinations of cold plate materials and bonding agent/adhesive choices are shown in FIG. 4.

Figure 3:
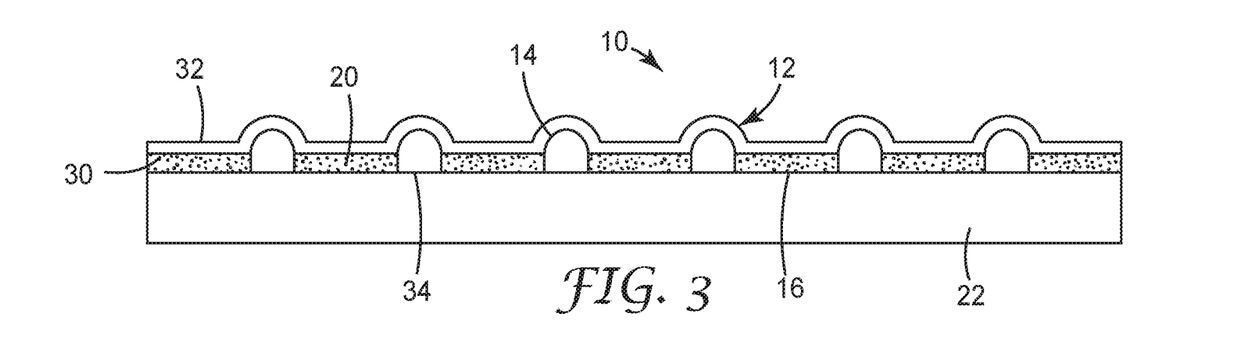
FIG. 3 is a cross-sectional side view of another embodiment of a cold plate assembly for an electric vehicle battery assembly, according to the present invention.

In FIG. 3, a cold plate assembly 10 for an electric vehicle battery assembly comprises a top plate 12 that is corrugated, stamped or otherwise formed with a patterned open-faced cooling channel 14 and intermediate land area 16 and strips or a pattern of organic bonding agent/adhesive 20 disposed so as to cover and bond together at least most (i.e., at least 50% of the surface area) or all of the intermediate land area 16 of the top plate 12 and corresponding area on an upper major surface of a battery tray 22.

Figure 4:
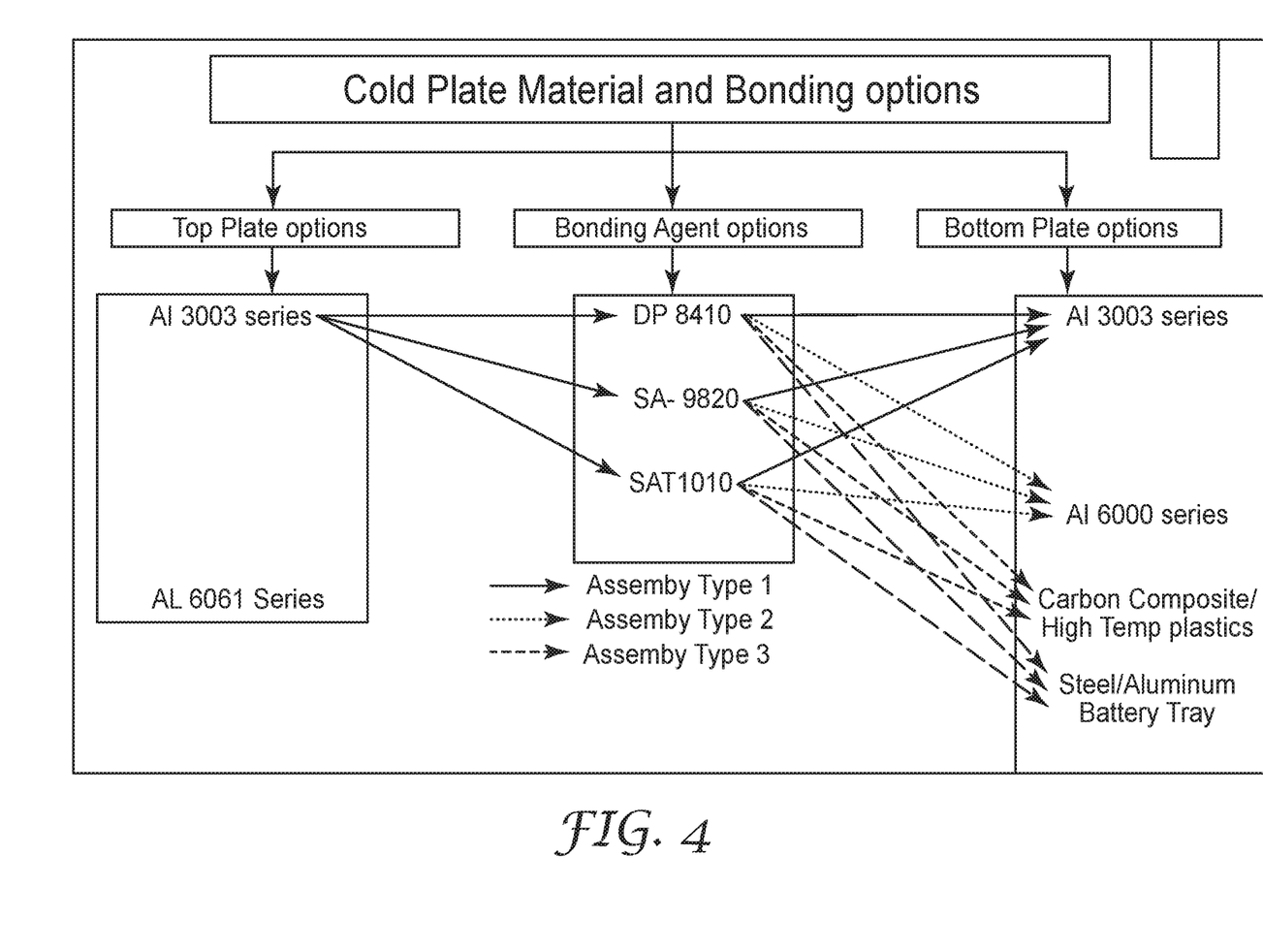
FIG. 4 is a matrix of some cold plate component materials and organic bonding agent/adhesive composition joining options.
Figure 5A:
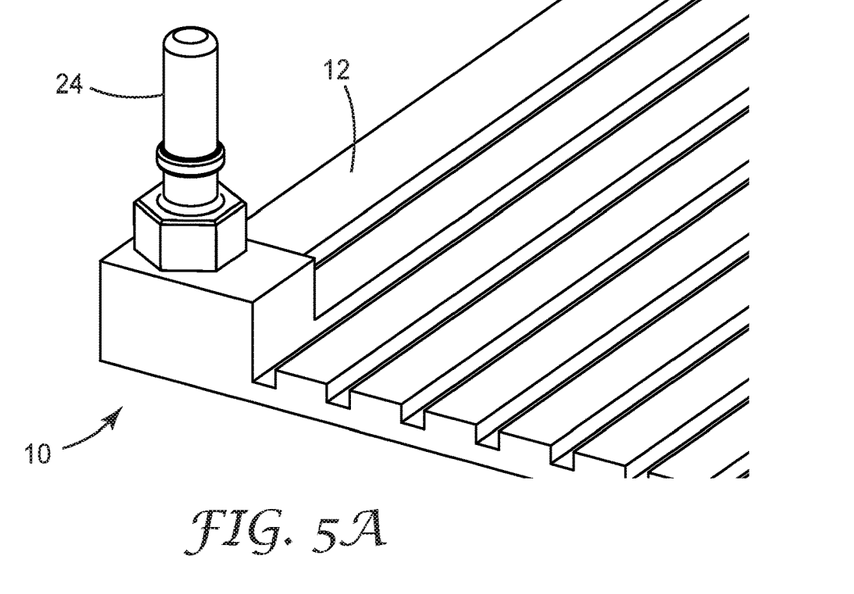
FIG. 5A is a perspective view of one embodiment of the channeled top plate of a cold plate assembly, with a coolant inlet port.
Figure 5B:
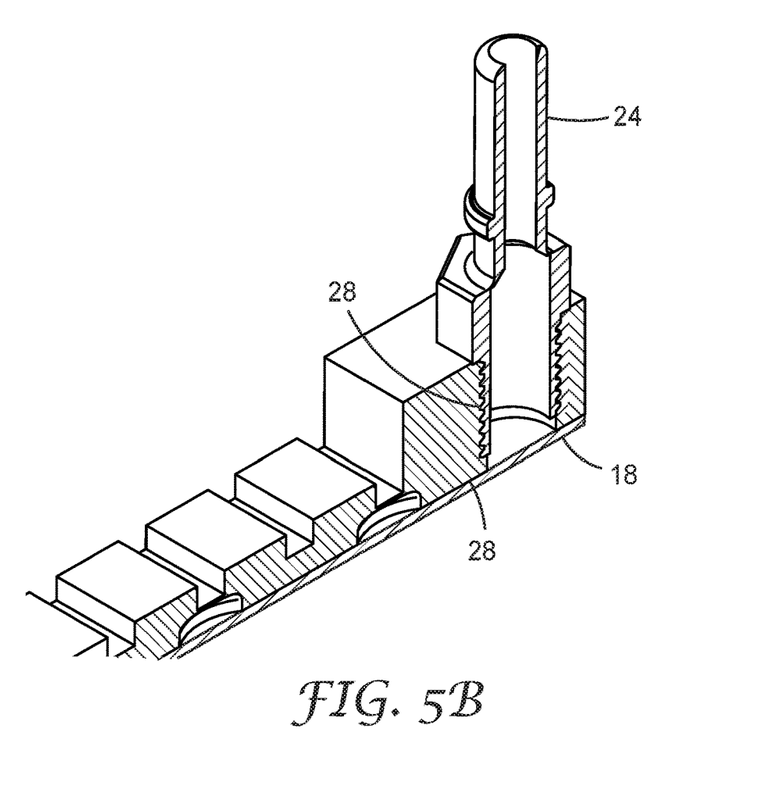
FIG. 5B is an enlarged cross-sectional view of the installed coolant inlet port of the top plate of FIG. 5A.
Figure 5C:
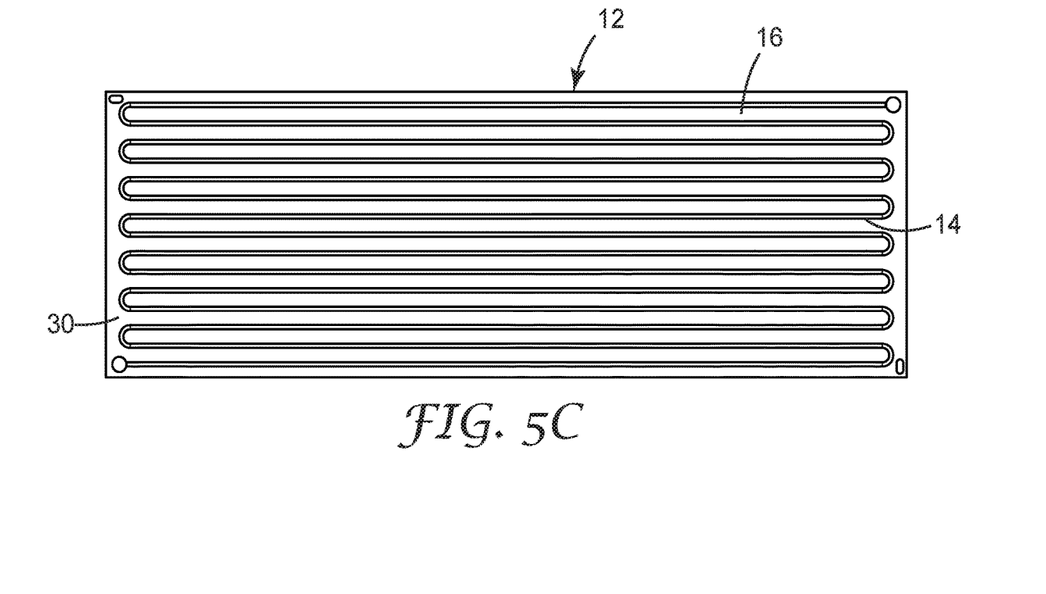
FIG. 5C is a top plan view of the lower major surface of one embodiment of a channeled top plate of a cold plate assembly, with its channel pattern visible.
Figure 5D:
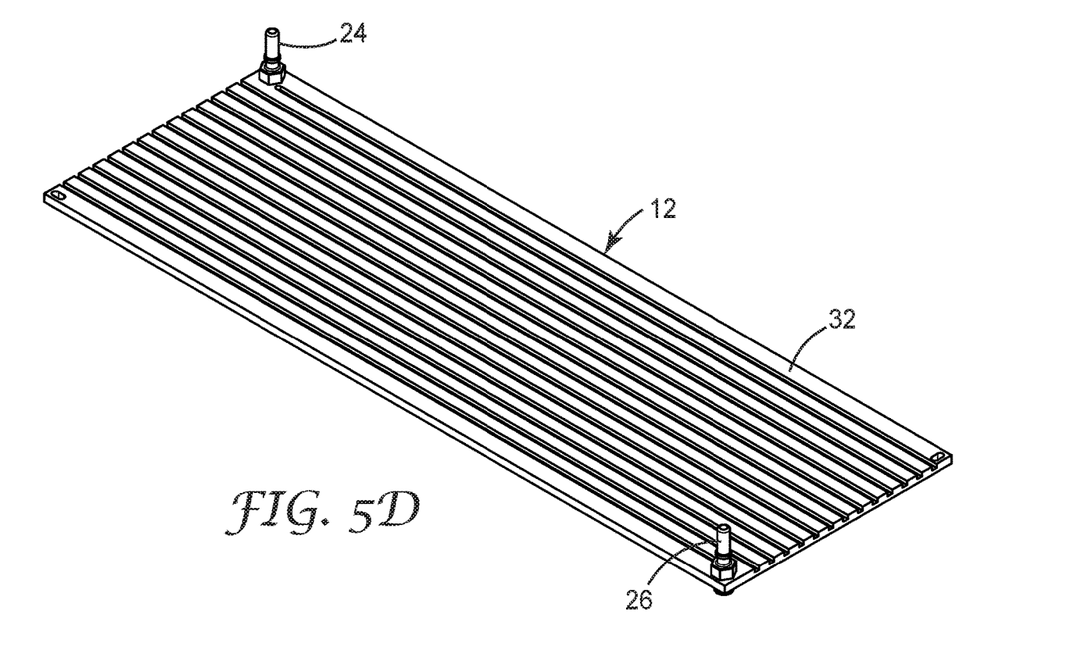
FIG. 5D is a perspective view of the upper major surface of one embodiment of the channeled top plate of a cold plate assembly, with a coolant inlet port and coolant outlet port.
Figure 6:
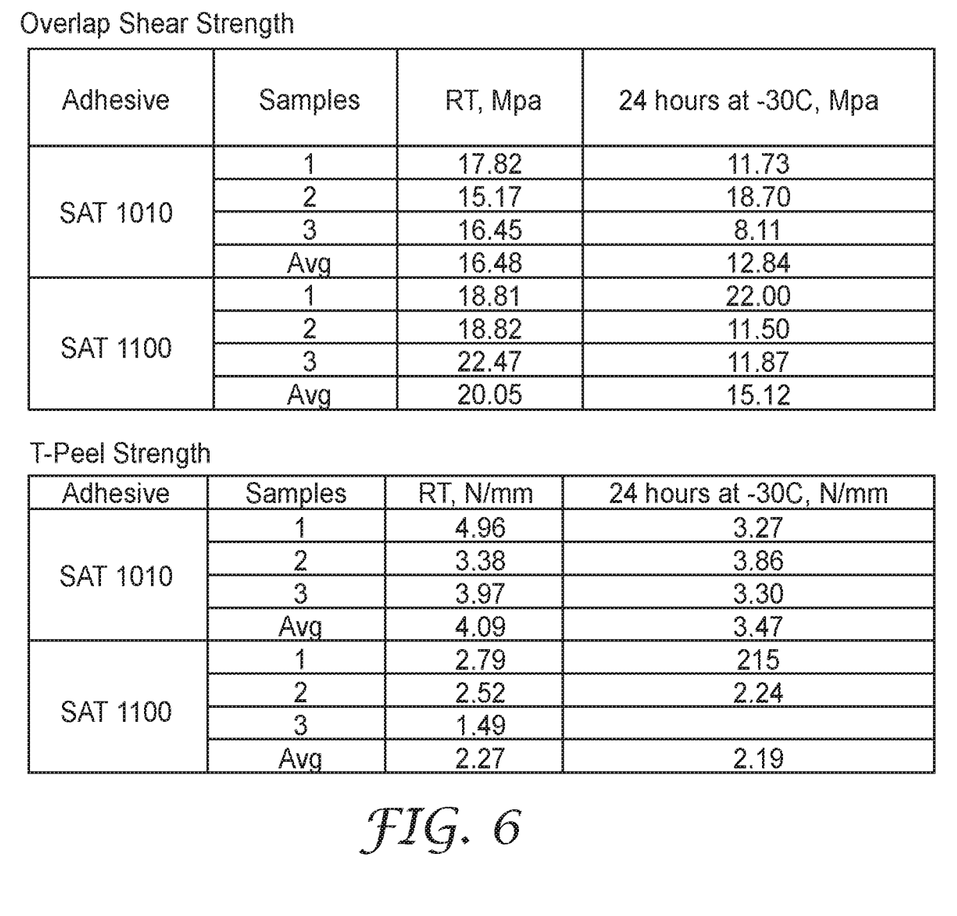
FIG. 6 is a Table of the Overlap Shear Strength and T-Peel Strength of various organic bonding agent/adhesive samples.

As shown in the matrix of FIG. 4, there can be advantages of having the bottom plate being made with carbon fiber reinforced polymer composites or with sufficiently high temperature plastics. For example, the overall weight of the cold plate can be reduced by adopting replacing the metal (e.g., aluminum) with a plastic material, because aluminum is generally 2 to 2.5 times heavier than many suitable plastics. In addition, such a material choice can improve the thermal insulation of the battery cells from the outside environment (e.g., temperatures), which can result in more effective heat transfer from the battery cells to the coolant through only the top metal plate, since the cold plate gets mechanically attached to battery tray, which is typically made of steel. Such a composite or polymeric bottom plate can also provide electrical isolation and galvanic isolation from the metal battery tray.

The integration of the cold plate components can also be achieved directly in to the battery tray (e.g., made of steel or cast aluminum) with adhesive technologies, including the same type of bonding agents/adhesives described herein for bonding together the cold plate components. One advantage to using the same bonding agent/adhesive for bonding together the cold plate components, the cold plate onto the battery tray, or the top plate directly onto the battery tray, is that all three type of assemblies can be run through the same adhesive curing cycle and avoid the need for any excess mechanical joints to separately hold the cold plate in place. In addition, galvanic isolation can be achieved despite the use of dissimilar metals.

The following Table 1 provides at least some of the features, advantages and benefits of using the bonding agents/adhesives: Structural Adhesives SAT1010 and SAT1100 and the Liquid Adhesives DP8410 and SA9820, which are each manufactured by 3M Company.

TABLE 1

| Feature | Advantages | Benefits |
| --- | --- | --- |
| Wide range of cure or processing profiles | Bonds to metal with stamping lubes | Reduces manufacturing costs associated with material prep and cleaning |
|  | Cure can be consolidated with other process steps | Simplifies manufacturing process |
| Stable at a controlled room temperature 21° C./70° F. (+/−2) up to 6 months after production | Does not require low temperature storage - compared to structural adhesive films | Fits into existing processes |
|  | Controlled application | Increased user flexibility |
|  | Bonds different materials | Worry-free assembly |
| Tape can be dispensed via automation | Seals and bonds metals | Improves quality by reducing variability of application Repeatable process |
| Adheres to multiple materials | Helps prevent water ingress that could lead to corrosion | Helps enable light-weighting |
| Expands during cure | Provides gap filling | May help reduce corrosion warranty claims in some applications Improves quality by reducing variability of application |
| Easy to use tape format | Supplied as a ready to apply product with the ability to be applied in defined locations | Cleaner application than liquid adhesives |
|  | Consistent thickness | Reduction in rework Improves quality by reducing variability of application |

The following Tables 2 to 5 provide various properties of the Liquid Adhesives DP8410 in its cured state.

TABLE 2

|  | 3M SCOTCH-WELD Acrylic Adhesive | | |
| --- | --- | --- | --- |
| Overlap Shear (psi) * Substrate | DP8405NS Green | DP8410NS Green | DP8425NS Green |
| Aluminum | 4400 CF | 3900 CF | 3800 CF |
| Stainless steel | 3700 CF | 3500 CF | 3400 CF |
| PVC | 1800 SF | 1700 SF | 1600 SF |
| ABS | 1100 SF | 1100 SF | 1100 SF |
| Acrylic | 1300 SF | 1300 SF | 1500 SF |
| Polycarbonate | 1200 SF | 1300 SF | 1200 SF |
| Polystyrene | 500 AF | 550 AF | 550 SF |
| Polyester (fiber-reinforced) | 750 AF | 1000 SF | 880 AF |
| Epoxy resin (fiber-reinforced) | 4300 CF | 4200 CF | 3300 CF |
| Aluminum (tested at −40 F.) | 2600 CF | 3600 CF | 3800 CF |
| Aluminum (tested at 180 F.) | 1300 CF | 1250 CF | 1450 CF |

* Overlap shear values were measured using ASTM D1002 with 1 min open time.

Adhesives were allowed to cure for 24 hours at room temperature ½" overlap with 0.010-inch bond line thickness.

Samples were pulled at 0.1 inches/min for metals and 2 inches/min for plastics. All surfaces prepared with light abrasion and solvent cleaned. Substrates used were 1/16-inch-thick metals and 1/8-inch-thick plastics. Aluminum failure modes include AF: adhesive failure, CF: cohesive failure, and SF: substrate failure.

TABLE 3

| | 3M SCOTCH-WELD Acrylic Adhesive | | |
|---|---|---|---|
| Tensile Property+ | DP8405NS Green | DP8410NS Green | DP8425NS Green |
| Tensile Modulus (psi) | 195000 | 190000 | Not tested |
| Tensile Strength (psi) | 2800 | 2250 | Not tested |
| Tensile Strain at Break (%) | 9.5 | 6.0 | Not tested |

+Tensile properties were measured using ASTM D638. Adhesives were allowed to cure for two weeks at room temperature. 1/8-inch-thick Type 1 test specimens were created, and samples were pulled at 0.2 inches/min.

TABLE 4

| | | 3M SCOTCH-WELD Acrylic Adhesive | | |
|---|---|---|---|---|
| Environmental Resistance ǂ | | DP8405NS | DP8410NS | DP8425NS |
| Condition | Substrate | Green | Green | Green |
| 300° F. (149° C.) | Aluminum | 100% | 100% | 100% |
| −40° F. (−40° C.) | | 100% | 95% | 100% |
| 120° F. (49° C.) at 80% RH | | 85% | 85% | 85% |
| 150° F. (66° C.) at 80% RH | | 65% | 60% | 60% |
| 185° F. (85° C.) at 85% RH | | 35% | 40% | 45% |
| Water | | 80% | 90% | 95% |
| 90° F. (32° C.) Water | | 75% | 85% | 85% |
| 120° F. (49° C.) Water | | 45% | 50% | 50% |
| Salt Water (5 wt % in water) | | 90% | 95% | 85% |
| Gasoline | | 80% | 75% | 55% |
| Diesel Fuel | | 100% | 100% | 100% |
| Motor oil | | 100% | 100% | 100% |
| Antifreeze (50 wt % in water) | | 100% | 100% | 100% |
| Isopropyl alcohol | | 90% | 90% | 85% |
| Bleach (10 wt % in water) | | 80% | 95% | 90% |
| −40° F. (−40° C.) | PVC | 100% | 100% | 100% |
| 120° F. (49° C.) at 80% RH | | 100% | 95% | 95% |
| 150° F. (66° C.) at 80% RH | | 100% | 100% | 95% |
| 185° F. (85° C.) at 85% RH | | 100% | 100% | 100% |
| Water | | 100% | 100% | 100% |
| 90° F. (32° C.) Water | | 100% | 100% | 95% |

TABLE 4-continued

| | | 3M SCOTCH-WELD Acrylic Adhesive | | |
|---|---|---|---|---|
| Environmental Resistance ǂ | | DP8405NS | DP8410NS | DP8425NS |
| Condition | Substrate | Green | Green | Green |
| Hydrocholric Acid (16 wt % in water) | | 100% | 95% | 95% |
| Sodium hydroxide (10 wt % in water) | | 100% | 95% | 90% |

ǂValues indicate overlap shear test performance retained after 1,000 hours of continuous exposure relative to a control sample left at room temperature. Samples were conditioned at 24 hours at room temperature and 50% relative humidity prior to testing.

Note:
Fully-cured structural adhesives can withstand short-term incidental contact with almost any solvent, chemical, or environmental condition. However, long-term continuous exposure of these Acrylic Adhesives to the following liquids should be avoided: 1) Elevated temperature (>100° F.) water and 2) ketone-type solvents (acetone, MEK)

TABLE 5

| | 3M SCOTCH-WELD Acrylic Adhesive | | |
|---|---|---|---|
| Floating Roller Peel (lb/inch width) ǂ | DP8405NS Green | DP8410NS Green | DP8425NS Green |
| Aluminum | 55 CF | 60 CF | 50 CF |

ǂFloating roller peel values were measured using ASTM D3167. Adhesives were allowed to cure for 24 hours at room temperature with 0.017-inch bond line thickness. Samples were pulled at 6.0 inches/min. The aluminum surfaces were etched. Substrates used were 1/16-inch-thick metals and 0.020-inch-thick plastics. Aluminum failure modes include AF: adhesive failure, CF: cohesive failure, and SF: substrate failure.

Note:
The data were generated using the 3M EPX Applicator System equipped with an EPX static mixer, according to manufacturer's directions. Thorough hand-mixing afford comparable results.

Referring to FIGS. 5A-5D, one embodiment of a channeled top plate 12, of a cold plate assembly 10, includes a coolant inlet port 24 and a coolant outlet port 26. An organic bonding agent/adhesive 20 can be used to form an adhesive joint 28 between either or both ports 24 and 26 and the top plate 12 (e.g., between mating threads, as shown), as well as to form an adhesive joint between the top plate 12 and bottom plate 18 (see FIG. 5B). A channel pattern 14 is formed on the lower major surface 30 of the channeled top plate 12, while the coolant inlet and outlet ports 24 and 26 are formed on the upper major surface 32 of the channeled top plate 12.

In one technique for applying a layer of liquid organic bonding agent/adhesive 20, the opening 34 of the channel pattern 14 (see FIGS. 2 and 3) is masked with masking tape, and the liquid organic bonding agent/adhesive 20 is applied onto the entire major surface of the lower major channeled surface of the top plate 12. After a layer of the organic bonding agent/adhesive 20 is applied to the entire major channel surface of the top plate 12, the masking tape is removed to reveal the coolant channels 14.

DP8410 Adhesive Substrate Surface Preparation

3M™ Scotch-Weld™ Acrylic Adhesives are designed to be used on painted or coated metals, most plastics, and some bare metals. The following cleaning methods are suggested by 3M for common surfaces. In each case, the surface is first wiped free of dust and dirt with a clean cloth and a solvent. For painted and coated metal surfaces and for plastics, the surface is wiped with pure isopropyl alcohol. For aluminum and stainless steel surfaces, the surface is wiped with pure acetone. Next, the surface is abraded using clean fine grit abrasives. Painted, coated metal, aluminum and stainless steel surfaces are sandblasted or lightly abraded. The paint layer or coating should not be removed down to bare metal.

Plastic surfaces are lightly abraded. Finally, the surface is wiped again with a clean cloth and the previously identified solvent to remove loose particles. When using solvents, extinguish all ignition sources, including pilot lights, and follow the manufacturer's precautions and directions for use.

Leak Testing

Exemplary cold plate assemblies were leak tested to verify the integrity of the adhesive joints by plugging or otherwise closing the outlet port and attaching a source of pressurized air to the inlet port of each tested assembly. First, the assembly is leak tested by pressurizing the coolant circulation channel to a pressure of 25 psi. Next, the assembly is leak tested by pressurizing the coolant circulation channel to a burst pressure of 45 psi. All sample assemblies passed both tests.

Embodiments

1. An electric vehicle battery cold plate assembly comprising a top plate having a lower major surface that is corrugated, stamped or otherwise formed with at least one patterned open-faced cooling channel formed therein and intermediate land area; a flat bottom plate; and a continuous or mostly continuous (i.e., at least 50% of its surface area is continuous) layer or sheet of organic bonding agent/adhesive disposed so as to cover and bond together at least most (i.e., at least 50% of the surface area) or all of an upper major surface of the bottom plate and at least most (i.e., at least 50% of the surface area) or all of the intermediate land area of the top plate.

2. An electric vehicle battery cold plate assembly comprising a top plate having a lower major surface that is corrugated, stamped or otherwise formed with at least one patterned open-faced cooling channel formed therein and intermediate land area; a flat bottom plate; and strips or a pattern of organic bonding agent/adhesive disposed so as to cover and bond together at least most (i.e., at least 50% of the surface area) or all of the intermediate land area of the top plate and corresponding area on an upper major surface of the bottom plate.

3. An electric vehicle battery cold plate assembly comprising a top plate having a lower major surface that is corrugated, stamped or otherwise formed with at least one patterned open-faced cooling channel formed therein and intermediate land area; a battery tray having an upper major surface; and strips or a pattern of organic bonding agent/adhesive disposed so as to cover and bond together at least most (i.e., at least 50% of the surface area) or all of the intermediate land area of the top plate and corresponding area on the upper major surface of the battery tray.

4. An electric vehicle battery assembly or module, the assembly comprising a plurality of battery cells; a cold plate assembly according to any one of embodiments 1 to 3 on which the battery cells are placed; and a mounting structure for securing the batteries in place within the electric vehicle battery assembly or module.

5. An electric vehicle comprising an electric motor; and at least one electric vehicle battery assembly according to embodiment 4.

6. The electric vehicle according to embodiment 5, wherein the electric vehicle is a land vehicle further comprising at least two wheels rotated by the electric motor.

7. The electric vehicle according to embodiment 5, wherein the electric vehicle is a watercraft further comprising a propeller rotated by the electric motor.

8. The electric vehicle according to embodiment 5, wherein the electric vehicle is an aircraft further comprising a propeller rotated by the electric motor.

9. A method of making an electric vehicle battery cold plate assembly comprising at least one enclosed cooling channel. The method comprises providing a top plate having a lower major surface that is corrugated, stamped or otherwise formed with at least one patterned open-faced cooling channel formed therein and intermediate land area; providing a bottom plate having an upper major surface, that is preferably but not necessarily flat; applying a layer of organic bonding agent/adhesive, in liquid and/or tape form (e.g., sheet and/or strips) onto at least most (i.e., at least 50% of the surface area) or all of the upper major surface of the bottom plate; and after the layer of organic bonding agent/adhesive is applied, bonding the lower major surface of the top plate and the upper major surface of the bottom plate together using the applied organic bonding agent/adhesive, wherein preferably only the intermediate land area of the top plate is bonded to the upper major surface of the bottom plate, and wherein the layer of organic bonding agent/adhesive forms a surface of the enclosed cooling channel.

10. A method of making an electric vehicle battery cold plate assembly. The method comprises providing a top plate having a lower major surface that is corrugated, stamped or otherwise formed with at least one patterned open-faced cooling channel formed therein and intermediate land area; providing a bottom plate having an upper major surface that is preferably but not necessarily flat, or a battery tray having an upper major surface that is preferably but not necessarily flat; masking so as to close the opening of the cooling channel (e.g., by covering the channel cavity with masking tape or filling the channel cavity with an easily removable material); applying a layer of organic bonding agent/adhesive, in liquid and/or tape form (e.g., sheet and/or strips) onto at least most (i.e., at least 50% of the surface area) or all of the lower major channeled surface of the top plate and optionally onto at least partially, mostly (i.e., at least 50% of its surface area) or all of the masking; after a layer of the organic bonding agent/adhesive is applied, removing the masking to open the coolant channels; and bonding the lower major surface of the top plate and the upper major surface of the bottom plate together using the applied organic bonding agent/adhesive, wherein preferably only the intermediate land area of the top plate is bonded to the upper major surface of the bottom plate, and preferably a surface of the enclosed cooling channel is formed by a corresponding portion of the upper major surface of the bottom plate or the battery tray.

11. The method of embodiment 10, wherein the battery tray is provided.

12. A method of making an electric vehicle battery cold plate assembly The method comprises providing a top plate having a lower major surface that is corrugated, stamped or otherwise formed with at least one patterned open-faced cooling channel formed therein and intermediate land area; providing a bottom plate having an upper major surface that is preferably but not necessarily flat, or a battery tray having an upper major surface that is preferably but not necessarily flat; providing strips or a pattern of organic bonding agent/adhesive; applying the organic bonding agent/adhesive so as to cover at least most (i.e., at least 50% of the surface area) or all of the intermediate land area of the top plate; and bonding the lower major surface of the top plate and the upper major surface of the bottom plate together using the applied organic bonding agent/adhesive, wherein preferably only the intermediate land area of the top plate is bonded to the upper major surface of the bottom plate, and preferably a surface of the enclosed cooling channel is formed by a corresponding portion of the upper major surface of the bottom plate or the battery tray.

13. The method of embodiment 12, wherein the battery tray is provided.

14. A method of making an electric vehicle battery cold plate assembly. The method comprises providing a top plate having a lower major surface that is corrugated, stamped or otherwise formed with at least one patterned open-faced cooling channel formed therein and intermediate land area; providing a bottom plate having an upper major surface, that is preferably but not necessarily flat; applying organic bonding agent/adhesive, in liquid and/or tape form (e.g., sheet and/or strips) onto the entire major surface of the lower major channeled surface of the top plate; after a layer of the organic bonding agent/adhesive is applied to the entire major channel surface of the top plate, removing the masking tape to reveal the coolant channels.

This invention may take on various modifications and alterations without departing from its spirit and scope. Accordingly, this invention is not limited to the above-described but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A method of making an electric vehicle battery cold plate assembly, said method comprising:

providing a top plate having a lower major surface with at least one patterned open-faced cooling channel formed therein and intermediate land area;

providing a bottom plate having an upper major surface or a battery tray having an upper major surface;

masking so as to close the opening of the cooling channel;

applying a layer of organic bonding agent/adhesive, in liquid and/or tape form onto at least most or all of the lower major channeled surface of the top plate and optionally onto at least partially, mostly or all of the masking;

after a layer of the organic bonding agent/adhesive is applied, removing the masking to open the coolant channels; and bonding the lower major surface of the top plate and the upper major surface of the bottom plate together using the applied organic bonding agent/adhesive, wherein the intermediate land area of the top plate is bonded to the upper major surface of the bottom plate, and a surface of the enclosed cooling channel is formed by a corresponding portion of the upper major surface of the bottom plate or the battery tray.

2. The method of claim 1, wherein the battery tray is provided.

3. The method of making an electric vehicle battery cold plate assembly according to claim 1, wherein the organic bonding agent/adhesive is in the form of strips.

4. The method of claim 1, further comprising applying a layer of organic bonding agent/adhesive at least partially, mostly or all of the masking.

5. The method of claim 1, wherein the organic bonding agent/adhesive is an acrylic structural adhesive.

6. The method of claim 1, wherein the organic bonding agent/adhesive isin a liquid form.

* * * * *